(12) United States Patent
Nesty

(10) Patent No.: US 7,775,659 B2
(45) Date of Patent: Aug. 17, 2010

(54) SUNGLASS LENS

(76) Inventor: Gary W. Nesty, 3622 E. County Rd. 600 N, Brazil, IN (US) 47834

( * ) Notice: Subject to any disclaimer, the term of this patent is extended or adjusted under 35 U.S.C. 154(b) by 0 days.

(21) Appl. No.: 12/082,475

(22) Filed: Apr. 11, 2008

(65) Prior Publication Data

US 2008/0252847 A1 Oct. 16, 2008

Related U.S. Application Data

(60) Provisional application No. 60/923,192, filed on Apr. 13, 2007.

(51) Int. Cl.
*G02C 7/10* (2006.01)
(52) U.S. Cl. ........................................ 351/165; 351/163
(58) Field of Classification Search .......... 351/163–165
See application file for complete search history.

(56) References Cited

U.S. PATENT DOCUMENTS

| | | | |
|---|---|---|---|
| 5,050,979 A | 9/1991 | Shinohara | |
| 5,054,902 A * | 10/1991 | King | 351/44 |
| 5,201,955 A | 4/1993 | Chika et al. | |
| 5,708,492 A | 1/1998 | Kitani | |
| 6,575,569 B1 | 6/2003 | Castellano | |
| 6,726,320 B1 * | 4/2004 | Mullin et al. | 351/44 |
| 6,918,670 B2 | 7/2005 | Blum et al. | |
| 7,374,282 B2 * | 5/2008 | Tendler | 351/49 |
| 2004/0227995 A1 * | 11/2004 | Gettens | 359/490 |

* cited by examiner

*Primary Examiner*—Darryl J Collins
(74) *Attorney, Agent, or Firm*—E. Victor Indiano; Indiano Vaughan LLP

(57) ABSTRACT

A polarized tinted lens for sunglasses includes a first polarizing tinting member and a second tinting member. The first polarizing tinting member is capable of reducing the transmission of glare through the lens. The second tinting member at least partially overlays the first tinting member so that light passing through the lens in the portion where the first and second tinting members are overlain must pass through both the first and second tinting members. Preferably the sunglasses created thereby are polarized sunglasses with two tints in one lens. The user can adjust the tint though which he sees by tilting his head or adjusting the angle of his eyes.

18 Claims, 7 Drawing Sheets

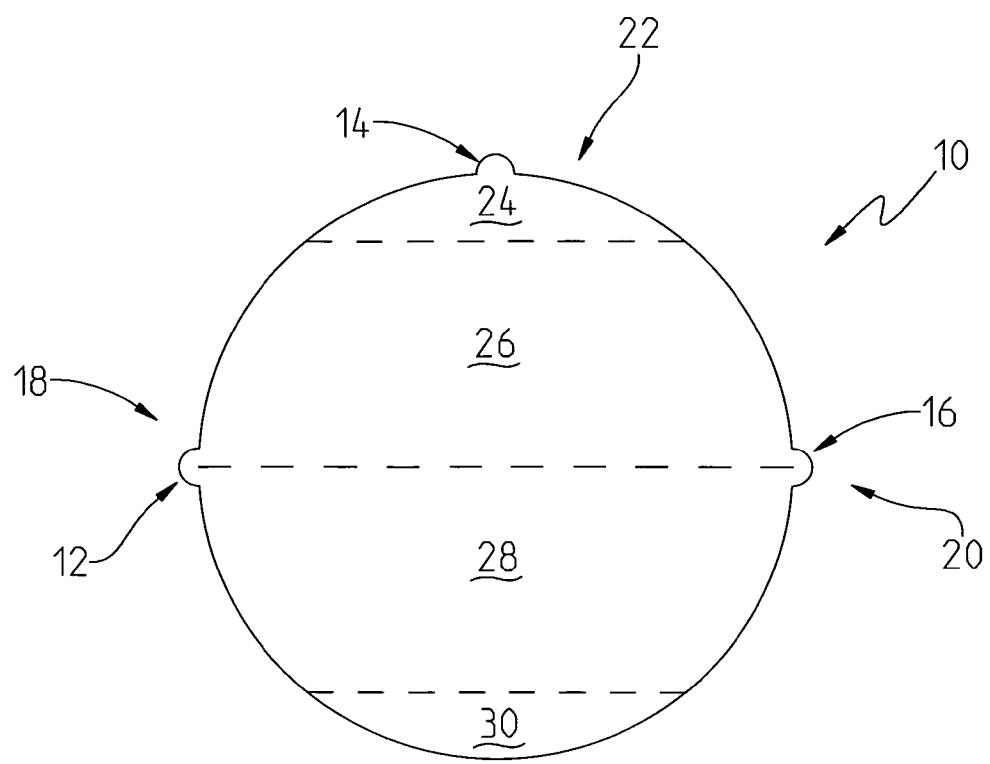
FIG. 1
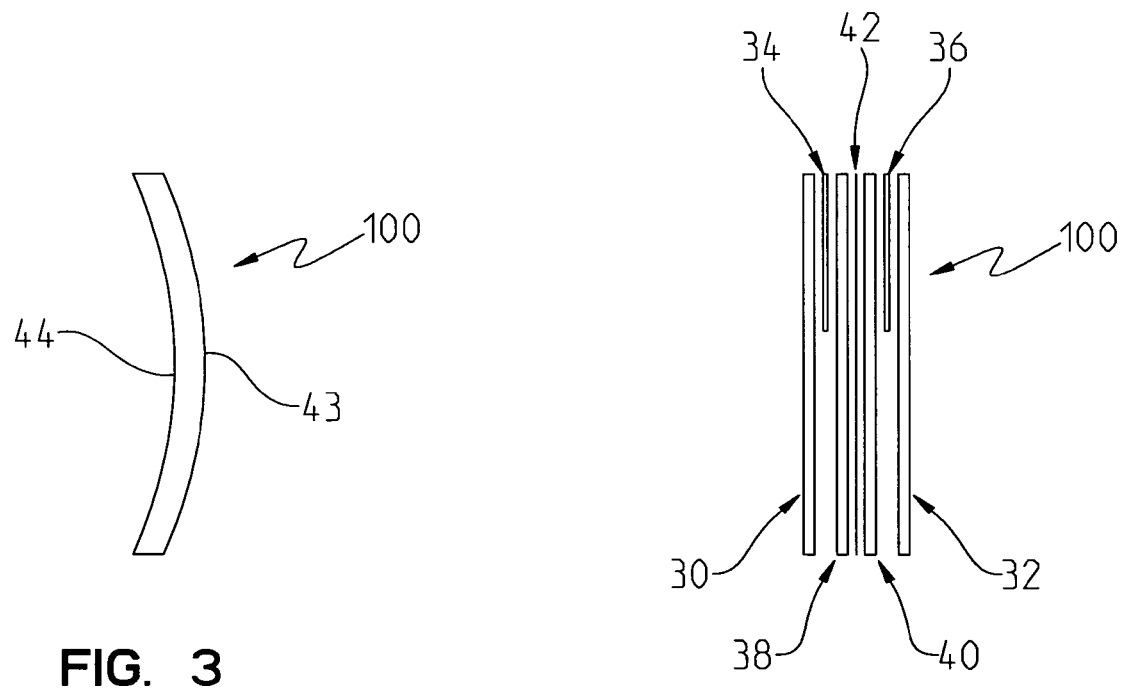
FIG. 3
FIG. 2

FIG. 5

| | ANSI | - EN - AS (nm) | |
|---|---|---|---|
| | Wavelength | Spectral Transmittance | |
| | 380 | 0.00 | 0.00 |
| | 390 | 0.00 | 0.00 |
| | 400 | 0.04 | 0.02 |
| | 410 | 0.37 | 0.20 |
| 111 → | 420 | 0.56 | 0.32 |
| | 430 | 0.74 | 0.41 |
| | 440 | 1.04 | 0.58 |
| | 450 | 1.70 | 0.95 |
| | 460 | 2.73 | 1.53 |
| | 470 | 4.04 | 2.24 |
| 114 → | 480 | 6.21 | 3.45 |
| | 490 | 10.46 | 5.16 |
| | 500 | 16.00 | 5.82 ← 116 |
| | 510 | 17.18 | 6.79 |
| | 520 | 17.91 | 8.02 |
| | 530 | 18.89 | 9.03 |
| | 540 | 16.66 | 8.29 |
| | 550 | 13.57 | 6.91 |
| | 560 | 13.87 | 7.13 |
| | 570 | 16.27 | 8.47 |
| | 580 | 15.25 | 8.32 |
| | 590 | 11.81 | 6.77 |
| | 600 | 10.10 | 5.78 |
| | 610 | 12.01 | 6.63 |
| | 620 | 13.91 | 7.39 |
| | 630 | 12.24 | 6.49 |
| | 640 | 9.30 | 5.00 |
| | 650 | 8.61 | 4.68 |
| | 660 | 14.00 | 7.37 |
| | 670 | 26.99 | 14.03 |
| | 680 | 41.42 | 22.18 |
| | 690 | 51.53 | 30.10 |
| | 700 | 60.68 | 39.08 |
| | 710 | 67.94 | 49.54 |
| | 720 | 74.34 | 59.84 |
| | 730 | 79.93 | 69.44 |
| | 740 | 83.32 | 77.83 |
| | 750 | 86.69 | 83.53 |
| | 760 | 88.29 | 87.39 |
| | 770 | 88.85 | 90.33 |
| | 780 | 90.33 | 91.83 |

109

High sunglare reduction Good UV protection

| Inspection item | Measured | | Judgement | | |
|---|---|---|---|---|---|
| | Value | | ANSI | EN | AS |
| Spherical power | +0.00 | | Pass | Class I | Pass |
| Astigmatic power | -0.61 | | Pass | Class I | Pass |
| Prismatic power | U 0.06 | | ----- | ----- | ----- |
| Prismatic power | O 0.33 | | ----- | ----- | ----- |

| ANSI Z80.3:2001 | | Tv = 10.81% | General purpose medium to dark |
|---|---|---|---|
| Yellow Traffic signal, Chromaticity coordinate: | X | | 0.572 |
| | Y | | 0.426 |
| Green Traffic signal, Chromaticity coordinate: | X | | 0.231 |
| | Y | | 0.588 |
| Average Daylight, D65, Chromaticity coordinate: | X | | 0.378 |
| | Y | | 0.493 |
| Red Traffic Signal Transmittance | | | 10.99%  Pass |
| Yellow Traffic Signal Transmittance | | | 10.51%  Pass |
| Green Traffic Signal Transmittance | | | 11.41%  Pass |

FIG. 7

| EN 1836-1997 | | | | | | | | |
|---|---|---|---|---|---|---|---|---|
| Blue Light | | 9.04 | | | | | | |
| 280-315nm MAX | UVB | 0.00 | | | | | | Pass |
| 315-350nm MAX | | 0.00 | | | | | | Pass |
| 315-380nm MAX | UVA | 0.00 | | | | | | Pass |
| 500-650nm MIN | | 6.65 | | | | | | Pass |
| Filter category | 3 | sign | | | | | | |
| rv %= | 10.88 | 9.94 | | 10.53 | | 11.53 | | 11.44 |
| Q | | Red | | Yellow | | Green | | Blue |
| | | 91.41% | | 95.85% | | 106.03% | | 105.18% |
| Dark Tint | | Pass | | Pass | | Pass | | Pass |

| AS/NZS 1067:2003 | | | | |
|---|---|---|---|---|
| Blue Light | | 9.04 | | |
| 280-315nm MAX | UVB | 0.00 | | Pass |
| 315-350nm MAX | UVA | 0.00 | | Pass |
| 315-380nm MAX | UVA | 0.03 | | Pass |
| 500-650nm MIN | | 1.33 | | Fail |
| Lens category | 3 | sign | | |
| rv %= | 10.88 | 9.94 | 10.53 | 11.53 | 11.44 |
| Q | Red | Yellow | Green | Blue |
| | 0.91 | 0.97 | 1.06 | 1.05 |
| Sunglasses | Pass | Pass | Pass | Pass |

FIG. 9

SUNGLASS LENS

I. PRIORITY

The instant application claims the benefit of Gary W. Nesty et al, U.S. Provisional Patent Application No. 60/923,192, which was filed on 13 Apr. 2007, and which is incorporated herein in its entirety.

II. TECHNICAL FIELD OF THE INVENTION

The present invention relates to lenses for eyeglasses, and more particularly, to a lens for sunglasses that is particularly well adapted for use in water related sports such as fishing.

III. BACKGROUND OF THE INVENTION

Traditionally, sunglasses comprise eyeglasses that employ lenses that are tinted to reduce the amount of light that passes through the lenses. This reduction in light intensity makes the lens useful by reducing eyestrain in bright circumstances, and saves the user from squinting when in brightly lit areas, such as the out-of-doors on bright, sunny days.

Sunglasses are tinted a variety of colors. Some have a brownish tint, others have a greenish tint. Other colors have also been used.

One feature that many sunglasses include is that they possess a "polarized" lens. Polarized lenses were originally invented by Edwin Land, who also invented the Polaroid Camera. The purpose of a polarized lens is to eliminate an orientation of glare. Depending upon how the lens is positioned (oriented), one can eliminate glare at any angle. If the lens is rotated about its axis, it can move from a point wherein it eliminates vertical glare, to a point when rotated 90, where it eliminates horizontal glare. Most sunglasses are designed to eliminate horizontal glare, as this is the glare that tends to be most bothersome to the user when viewing things in bright light.

Horizontally polarized glare is the type of glare that is usually created when light reflects off a surface such as the surface of a water body or a road. The horizontally polarized light is blocked by vertical polarizers in the lens.

There are several ways that lenses can be tinted to have a color imparted to them. One way that lenses can be tinted is by mixing a color into the plastic from which a plastic lens is molded. Another way to make a tinted lens is to dye a colorant into a lens after the lens is molded.

Although sunglass lenses can be made of glass, most sunglass lenses today are made of some type of plastic. Many better sunglass lenses are made from a polycarbonate material that has desirable durability and optical clarity properties.

One of the better methods for making polarized tinted sunglasses is to introduce a tinted polarized film material, such as a green polarizing film into an injection mold cavity. The plastic stock material (e.g. polycarbonate) is then injected into the injection mold cavity on either side of the film, so that when finished, the polarized tinted film is sandwiched between two layers of polycarbonate. A hardening material can then be placed over the exterior surface of the polycarbonate material to make the lens more scratch resistant.

Most lenses are tinted a single uniform color throughout the lens. As such, the lens will have the same tinting at the top of lens as it will at the bottom; the same at the left side, as it will at the right side. Such lenses perform their function well, and are generally easy to produce by the process described above.

Another type of tinted lens is a gradient lens, wherein the color of the lens varies from one side of the lens to the other.

In a typical gradient lens, the lens is tinted to be darker toward the top of the lens, and lighter toward the bottom of the lens. This type of gradient has value because the darker top portion of the lens will tend to tint out the greatest source and quantity of glare, which is typically the sun overhead, while providing a less tinted area in the lower portion of the lens that enables the user to read through the bottom portion of the lens. As such, this typical type of gradient lens is analogous to a bifocal clear lens, in that it divides the lens into two zones. Whereas a bifocal lens will typically divide a lens into a far distance lens at the top and a close reading lens at the bottom, the gradient lens will divide the lens into a relatively more glare or light-blocking portion in the top portion and a relatively more light transmissive portion in the bottom portion.

Gradient lenses are usually not manufactured by the technique described above for single-color lenses. Rather, gradient lenses are typically made by dying the lens with a liquid dye that causes the lens to take on the desired color. In order to get the gradient effect, the lens is dipped into a vat of coloring materials "upside down", so that the bottom of the finished lens is closer to the top of the surface of the immersion tank. At the beginning of the cycle, the lens will often be totally immersed within the dye solution and is held in the tank with a fixture. Over time, the fixture that holds the lens raises the lens out of the dye solution. This process causes the top of the finished lens (that, as described above, is positioned closer to the bottom of the dye vat) to remain within the dye for a longer period of time than the bottom of the finished lens. By remaining immersed in the dye for a longer period of time, the top of the lens can absorb more dye, and hence, can be tinted to a darker color.

By contrast, the bottom of the finished lens (which of course is placed closer to the upper surface of the dye in the vat), is the first part of the lens to be removed from its immersion in the dye, as the jig or fixture raises the lens upwardly out of the dye vat. As such, the bottom of the finished lens spends less time within the dye, and therefore, absorbs less dye. A result thereof is the bottom portion is not tinted to as deep (dark) of a color as the top of the lens.

Unfortunately, there is an important drawback to using a dying process for creating sunglasses. This drawback is that polarized glasses can not be made through a dying process, as described above. Rather, achieving a polarized lens is currently achievable by using the film process or coating, since the film or coating contains the "polarizers" necessary for the creation of a polarized lens. As such, although a dying process can be employed to create a gradient sunglass lens, it can not be used to create a gradient polarized sunglass lens. Further, polarized coatings are not durable over time.

Different types of lenses are more or less useful for different types of circumstances and user preferences.

Gray tinted lenses have the benefit of trapping all wavelengths of color generally equally. As such, gray lenses are often preferred because they maintain the natural colors that the user is viewing, although the intensity (or brightness) of the colors is reduced. The intensity of color is reduced because a user viewing the world through a pair of gray lenses sees less brightness because the sunglasses absorb the wavelengths and reduce the intensity of the light entering the user's eyes.

Lenses that are tinted in colors other than gray tend to have selective absorption characteristics that filter certain wavelengths of light a greater degree than they filter other wavelengths. For example, amber colored glasses tend to filter out a greater percentage of blue light out than red light. Some users value the blue blocking propensities of amber glasses, because blue light, being at the edge of a visible spectrum, tends to causes more eye strain than other wavelengths of light, such as red light. As such, amber lenses enhance the comfort of the user, because they block out a greater percentage of the most irritating blue light wavelengths than lenses of other colors. The user using an amber pair of sunglass lenses views the world through a tint of distorted colors, with the blue tones being less prominent and the red tones being highlighted.

The Applicant has found that green tinted polarized glasses are especially valuable for certain water-related activities, and especially fishing-related activities. A green polarized lens is valuable for fishermen because a green lens will tend to allow green light to pass through the lens while filtering out other colors to a much greater extent and eliminating glare from the surface of the water. This has the result of highlighting green objects that the user views.

When fishing, and especially when fishing in freshwater, many of the objects that a fisherman is looking for are green in color. These green objects include such things as weed lines, and certain fish species. Most freshwater fish have a greenish tint to them, with certain desired species such as bass, and bluegill being predominantly green. The use of green lenses thereby helps fishermen to spot fish in the water more easily, and also to spot things such as weed lines. Being able to spot weed lines enables the fishermen to better choose a location in the water at which to throw their fishing lines and hooks.

Because of these properties of green lenses, the Applicant has had significant success selling such green polarized tinted lenses to fishermen.

However, another factor that must be considered when designing a pair of sunglasses is not just the color of lens chosen, but the particular shade and depth of color chosen. A darker shaded lens tends to filter out more light, and a lighter shaded lens tends to filter out less light. Although this enhanced filtering out of light by darker lenses does have a benefit in bright sunshine, it also has the drawback of making it more difficult for the user to see objects appropriately in less well-lit circumstances, such as when the user is fishing in the shadows, or at dusk or early morning when less light is available.

By contrast, a lighter shade of lens, while beneficial to the user in low light conditions, may not block enough light in highly intense conditions to prevent discomfort to the user or prevent him from squinting.

One factor that exacerbates this issue is that during a session of fishing, the fisherman will often move from shadowy areas to the lighted areas on a fairly regular basis. This movement will occur both because the fisherman decides to move location, and also because clouds moving overhead will block the sun from time to time. This cloud movement can change a well lit area into a shadowed area as the clouds pass between the user and the sun. Further, as time passes, shadows will increase or decrease as the position of the sun moves relative to the foliage around the pond.

To overcome this problem, many fishermen carry two pairs of sunglasses with them while fishing. It is not unusual for a fisherman to wear a pair of lanyards around her neck, with each lanyard being coupled to a different pair of sunglasses. One of the pair of sunglasses is typically shaded very darkly to provide desired light blockage when the fisherman is in bright sun, and the second pair will be colored more lightly, and will be worn when the fisherman is in a shadowed area.

Being forced to carry around two pair of sunglasses on a pair of lanyards represents both an additional expense to the user, and also an inconvenience.

It is therefore one object of the present invention to produce sunglass lenses that contain a relatively more darkened first portion to block out bright sun, and a second portion that is relatively lighter tinted to enable the fisherman to see well in low light conditions.

It is a second object of the present invention to provide a lens wherein both the darker portion and the relatively lighter portion are both polarized, to help reduce glare.

IV. SUMMARY OF THE INVENTION

In accordance with the present invention, a tinted lens is provided for a sun glass. The tinted lens includes a first polarizing tinting member that is capable of reducing the transmission of glare through the lens. A second tinting member is provided that at least partly overlays the first tinting member, so that light passing through the lens in the portion where the first and second tinting members are overlain, must pass through both the first and second tinting layers.

As will be discussed in more detail below, the first and second tinting layers are described as being overlain, with reference to the passage of light therethrough. As such, the first and second tinting members are overlain, so that a ray of light passing through an area where they are overlain, will pass through both the first and second tinting members.

The first tinting member preferably extends throughout the entirety of the finished lens, so that the entire lens will be a polarized lens. The second tinting member is preferably tinted to a darker tint than the first tinting member.

The second (darker) tinting member should be disposed predominately along the top portion of the finished lens, so that the bottom portion of the lens blank either contains only very little influence of the second tinting member, or else no influence of the second tinting dye. The resulting lens should thereby be a lens wherein the top portion is relatively darker than the lower portion.

For fishing purposes the Applicant has found that preferably the top portion comprises a relatively dark green tint, whereas the bottom, or less tinted portion comprises a yellowish green.

In a preferred embodiment of the present invention, the first tinting member allows a generally greater degree of yellow and green light to be transmitted through the lens than any of blue light, orange light or ultra-violet light. Additionally, the top portion (also referred to herein as the first zone) preferably comprises between 50% and 60% of the area of the finished lens, and optimally, about 55% of the finished lens. The lower portion (also referred to herein as the second zone) comprises the remainder of the area of the finished lens, and preferably comprises somewhere between 40% and 50% of the finished lens, and optimally, about 45% of the finished lens.

Presented below in the detailed description and drawings is a more detailed description of the lens of the present invention which represents the best mode of practicing the invention perceived presently by the Applicant.

V. BRIEF DESCRIPTION OF THE DRAWINGS

FIG. 1 is a front view of the sunglass lens of the present invention.

FIG. 2 is an exploded side view of the sunglass lens of the present invention.

FIG. 3 is a side profile view of the lens of the present invention.

FIG. 5 is a chart showing the light transmission characteristics of a most preferred embodiment of the lens of the present invention, across a broad array of wavelengths;

FIG. 6 is a chart showing the sunglass reflection characteristics of a most preferred embodiment of the lens of the present invention;

FIG. 7 is a chart showing testing results relating to the ability of a most preferred embodiment lens of the present invention to allow light having the colors of traffic signal lights to be transmitted therethrough;

Figure 4:
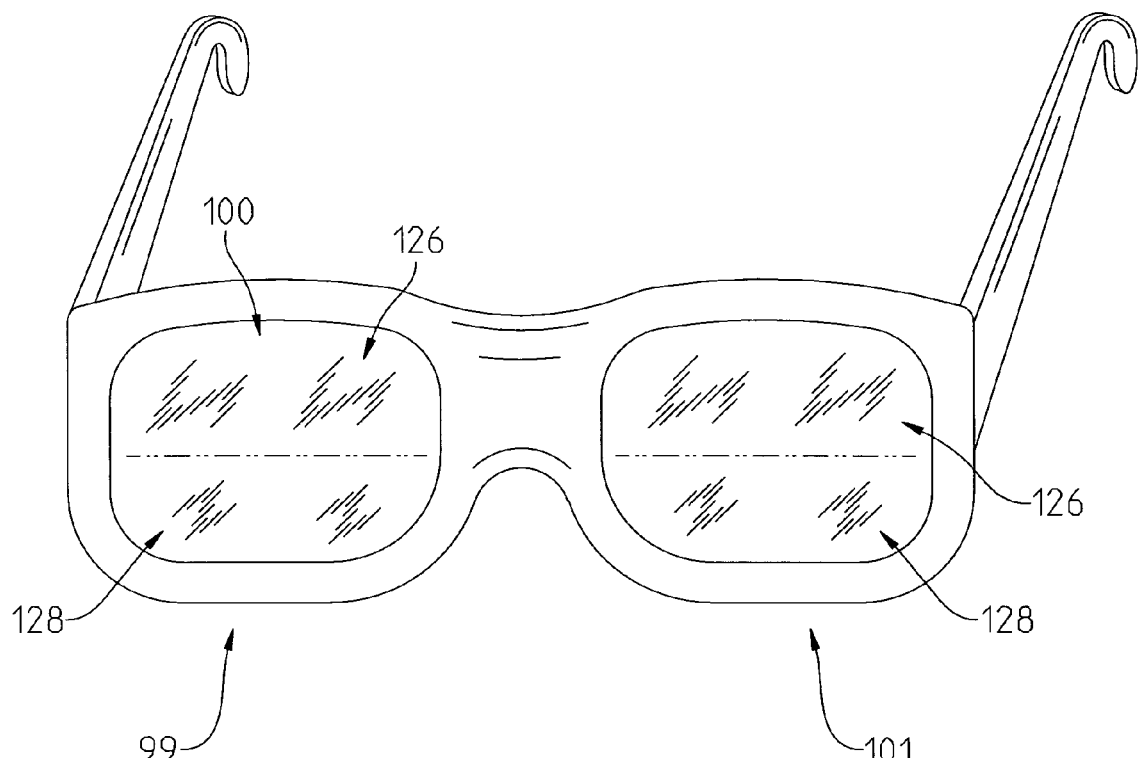
FIG. 4 is a front view of a pair of sunglasses containing the lenses of the present invention.

FIG. 8 is a chart showing test results relating to the ability of a most preferred embodiment of a lens of the present invention to block ultra-violet rays being passed through the relatively darkened upper portion of the lens; and FIG. 9 is a chart showing the test results relating to the ability of a most preferred embodiment lens of the present invention to block the passage of ultra-violet rays through a relatively less darkly tinted lower portion, using a methodology of the American National Standards Institute.

VI. DETAILED DESCRIPTION OF THE PREFERRED EMBODIMENT

FIG. 1 is a front view of a sunglass lens blank 10 from which the finished lens 100 will ultimately be formed. As will be noted, the lens blank 10 is generally round, which is different than the shape of the finished lens 100 (FIG. 4) within a pair of sunglasses 99 (FIG. 4). After being tinted, the lens blank 10 shown in FIG. 1 is cut to the appropriate size to fit within the frames of the sunglasses 99. It has been found by the Applicant and others, that a typical round lens blank can be trimmed to fit within the lens containing apertures of the frames of most styles of eye glasses.

Unless otherwise discussed herein, the sunglasses 99 described herein will be described as non-prescription sunglasses, that are designed to provide no visual correction, as prescription sunglasses are subject to a multitude of different curvatures to correct a multitude of different eye problems. With prescription glasses, one may select from multiple different lens blanks having different base curves for the frontal surface. The lens is then ground to prescription by grinding the back surface of the lens to the appropriate curvature necessary to correct the user's problems.

However, in order to avoid the complications induced by prescription glasses, the device discussed herein will be described with reference to a non-prescription glass, wherein the base curve (front of the lens) is the same curve as the curvature of the back of the lens. It should be understood, however, that the present invention can also be applied to creating prescription sunglasses by incorporating a lens grinding step into the process.

Once one has a lens blank 10 that is tinted appropriately according to the present invention, one then cuts the blank 10, so that it is sized and shaped to fit within the lens receiving aperture of the sunglasses 99 frame (e.g. frame 101). This cut lens blank that becomes the final lens 100 will typically be cut from the center portions of the lens blank 10.

Turning now to FIG. 2, it will be noticed that the finished lens 100 includes a plurality of layers 30, 32, 34, 36, 38, 40, and 42. As alluded to above, one starts out with a polarized film 42 of a relatively lighter tinted transmittance material. The lighter tinted film 42 is preferably tinted to a yellowish green color, and is placed into a molding apparatus. Clear layers which preferably comprise polycarbonate layers 38, 40 are formed around the film in the molding apparatus, to form a lens "sandwich" with a polycarbonate layer 38, 40 on either side of the film 42. As the film 42 is polarized, this provides a polarized lens 100 having a relatively light shade of tinting. The lens 10 is then held by its bottom and placed into a dye vat.

The lens 10 is placed at a particular depth into the dye vat, so that a layer of blue dye forming a blue dyed portion 34, 36 is absorbed by the polycarbonate lens portions 38, 40. As shown in FIG. 1, the blue dyed portions 34, 36 should extend approximately half way down the lens blank 10, so that approximately 50% of the surface of the lens contains the blue dyed portion, and 50% of the lens (the lower half in the finished lens 100) does not contain the blue dye. The Applicant has found that the dark half/light half percentages can be varied between a 60-40 (dark/light) and 40-60 (dark/light) range. However, the most preferred alignment is that the dark dyed portion 126 should comprise 55% of the finished lens and that the lighter tinted portion (or non-dyed portion) 128 should comprise about 45% of the surface of the finished lens 100.

Because the film 42 is preferably a yellowish green film, the particular dye that is chosen to dye the dyed lens portion is a blue dye that, when used in conjunction with the yellowish green film, forms a darker green lens portion 126 in the upper portion 126 of the finished lens 100.

After the dye is applied, a hard surface coating 30, 32 is applied to the outer front and rear surfaces of the lens blank 10 that covers both the polycarbonate layers and blue dye portions on both sides of the lens, so that the lens blank 10 is encased within the hard coating 30, 32. This coating layer 30, 32 makes the lens 10 more scratch resistant.

As best shown in FIG. 1, the lens blank 10 actually includes four zones. The first or upper most zone 24 comprises a portion of the lens that is typically not used in the finished lens 100. However, the upper most zone 24 typically winds up being dyed blue, since being at the top of the lens 10, it would be the lower most portion of the lens blank 10 that is dipped into the vat and thus become dyed. Also, the film 42 need not be placed in the upper most zone 24, since the upper most zone 24 will likely be cut away from the blank 10 to form the tinted lens 100. The upper most zone 24 will not take on the green tint of the film containing second zone 26.

The second zone 26 of the lens blank becomes the dyed upper portion 126 of the finished lens 100 (FIG. 4). This dyed upper portion 126 ultimately becomes the darker shaded portion of the finished lens 100. As stated above, this upper portion 26 should preferably comprise about 55% of the vertical length of the finished lens 100. The third zone 28 is the lower portion zone 28 wherein the predominate color of the lens blank 10 is the color imparted by the lightly tinted film 42 that is sandwiched between the two polycarbonate layers 38, 40. The lower most zone 30 is not used in the finished lens, and as such, there is no need to place a film thereon. Similar to upper most portion 24, the lower most portion 30 is cut away from the blank 10 during the formation of the finalized lens 100.

There is usually no reason to dip the lowest zone 30 in the dye tank to pick up dye thereon. Rather, a primary function served by the lower most portion is to serve as an area where a jig or fixture can grab the lens blank 10.

Through the use of this type of lens and especially with a green tinted lens, one benefit that the user receives is that if the user is fishing on a very bright day, the user can look through the top portion 126 of the glasses 99. The relatively darker green tint of the dark portion 126 of the glasses 99 will help to illuminate green objects, such as green fish and green weed lines, thus providing the user with enhanced vision for sighting fish.

However, when the user is fishing in the shadows or only when the sun is hidden behind the clouds, the user can then sight through the bottom portion 128 of the glasses 99, that have a lighter YELLOW/green tint imparted either solely or primarily by the film 42. The yellowish features of the greenish-yellowish portion 128 will tend to brighten up the areas at which the user is looking. The greenish nature of the yellow-green tint used for the film 42 of the most preferred embodiment will help to brighten up green objects such as fish and weed lines that the user desires to see when fishing.

The lens blank 10 has a generally circular profile. Three tabs 12, 14, 16 are formed on the sides 18, 20 and the top 22 of the lens respectively for the purpose of proper orientation of the polarized film in the finished lens. The tabs are preferably positioned at 12 o'clock, 3 o'clock and 9 o'clock on the round blank 10. The lens blank 10 is useful for many sunglass frame designs. The generally round profile lens blank 10 can be cut to take on a very wide variety of finished shapes to fit within the aperture of the front piece of the sunglass frame 99. The lens features a convex side profile (FIG. 3).

Zones two and three 26, 28 are the primary functional zones of the lens 10. Zone two 26 consists of approximately 55% of the functional area of the finished lens 100 and zone three 28 consists of approximately 45% of the functional area of the finished lens 100. Although a 55%/45% division between zones two 26 and three 28 is preferred, the ratio may be varied depending upon the desires of the user and/or manufacturer. There is a color gradient created by the layers of blue dye 34, 36 applied to the lens 10 during its fabrication. As will be appreciated, the finished shape of lens 100 will vary from frame style to frame style, as the size and shape of the lens receiving aperture of the sunglass 99 frame varies among different style frames. The lens is tinted a dark green at the top of zone two 26 and transitions to a yellow tint in zone three 28. This transition can be relatively abrupt. Preferably, however, the dye in the transition area is applied to the lens in a gradient manner so that a smooth and gradual transition exists between the heavily dyed (and hence darkly tinted) portions of the upper zone 26, and the barely-if-at-all dyed (and hence lightly tinted) portion of the lower zone 28.

The side view of the lens 10 of FIG. 2 shows the individual components that comprise the sunglass lens. The lens 10 has a convex outer surface 43 and a concave inner surface 44. The convex/concave nature of the outer and inner surfaces 43, 44 allows a wider range of protection and vision. As best shown in FIG. 1, the lens blank 10 (and the finished lens 100) consists of several layers that form a "lens sandwich". These layers provide functionality to the lens 10. The layers include hard coating outer layers 30, 32, dye layers 34, 36, polycarbonate layers 38, 40 and a layer of polarizing yellow-tinted film 42.

Bracketing the exterior surfaces of the lens 100 on both sides are layers of a hard coating material 30, 32. This coating helps protect the lens 10 from everyday wear and tear. For example, the hard coating layers 30, 32 enhance the scratch resistance of the lens 10. This is important because glasses 99 containing polarized lenses are designed with active uses in mind where a reasonably high probability exists that the sunglasses 99 will be subject to rough treatment. It is easy for a user to drop his sunglasses 99 when he is moving his equipment to his favorite fishing spot, and if the lens scratches, his ability to fish comfortably throughout the day and the rest of the trip is greatly reduced.

Adjacent to, and interiorly of the hard coating layers 30, 32 are two layers of polycarbonate with the top portions having absorbed blue dye 34, 36. The dye layers 34, 36 are designed to protect the user from reflections and glare. As such, the dye layers 34, 36 extend only through zone two 26 on the lens 10 so that the dyed layers reside on the upper portion 126 of the finished lenses 100 (FIG. 4). In fabrication, the lens blank 10 is dipped in a vat of dye through zone two 26. This process creates a natural gradient of blue dye, as the top 22 of the lens 10 is exposed to the dye for a longer period of time the rest of the lens. If the lens 10 is removed gradually enough from the vat in which it is dyed, a gradient smoothly transitioning light to dark tinting gradient can be formed.

The center portion of the lens 10 consists of two polycarbonate layers 38, 40 and a layer of polarizing film 42. The polycarbonate layers 38, 40 comprise the primary body and mass of the lens 100. Polycarbonate is desired for its toughness and optical clarity. Polycarbonate is also a reasonably inexpensive material that is easily formed, which aids in producing the lens 10 at a low, practical cost.

The polarizing film 42 provides the necessary polarizing properties and allows for the filtration of some of the glare from the visible spectrum. The polarizing film 42 employed typically has a width that is less than the diameter of the lens blank 10, and as such, does not become incorporated into the uppermost 24 and lowermost 30 zones, while being fully incorporated into the upper 26 and lower 28 zones.

Turning back to the fabrication of the lens 10, the uniform shape is important for several reasons. First, it allows the lens 10 to be manufactured cheaply and efficiently. The one piece molding fabrication allows the lens to be cut into desired shapes, from a traditional aviator design which is extremely useful in outdoor activity to more unique modern designs. The tabs 12, 14, 16 are created in the mold and will always be removed when the lens 10 is cut to fit a sunglass frame.

FIG. 5 comprises a chart 109. The chart 109 includes these columns, 111, 114 and 116. Column 111 contains a listing of various wavelengths between 380 nm and 780 nm, which include the visible spectrum, along with the ultraviolet and infra-red fringes of the visible spectrum. Column 114 and 116 shows transmittance values through the lens showing the light transmission characteristics of a lens of the present invention. It will be noted that the present invention has different transmittances over different portions of the spectrum. The transmittance characteristics are what one might expect of a yellowish-green sunglass lens, as the chart demonstrates light in ultra violet portion of the most highly absorbed (very little transmittance through the lens); light in the violet (~400 nm) and blue (~475 nm) portion is very highly absorbed; light in the orange (~590 nm) and red (~650 nm) portion is highly absorbed, but less highly absorbed than light in the blue and ultra violet portions. Green (~510 nm) and yellow (~570 nm) light are the relatively least absorbed portions of the visible spectrum, except for light in the infra-red portion of the spectrum (~690 nm and longer). Viewed another way, the yellowish-green lens allows yellow and green light to be transmitted through the lens more easily and to a greater extent than light in other portions of the visible spectrum; and that blue and violet light are the colors whose transmission through the lens is the most highly restricted.

The two columns with spectral transmittance shown in that table are, respectively, a first column 114, that gives the spectral transmittance of the lower portion 128 of the lens, that contains only the light green polarizing film 42 for tinting; and a second column 116 that provides a spectral transmittance of the top portion 126 of the lens that achieves its tinting both from the light green polarizing film 42, and from the dark blue dye to create the relatively darker green lens portion.

Table 120 (FIG. 7) affirms that the lenses provide suitable transmission of wavelengths in the color range in which red traffic lights 130, yellow traffic lights 132, and green traffic light 134 operate and transmit light. This test verifies that the lenses tinted according to the present invention will not impair a driver's ability (to an un-acceptable degree) to determine the difference between red, yellow and green traffic signals based upon their perceived color. As such, this test helps to signify that the lens of the present invention is suitable for use when driving, along with fishing.

Chart 140 (FIG. 8) relates to the ability of the lens 100 to filter out harmful UVA and UVB light. It will be noted that the lens tinted according to the present invention is capable of appropriately filtering out both UVA and UVB wave lights to accepted standards for a UV light filtering lens.

Chart 140 (FIG. 8) more particularly relates to the upper portion 126 of the lens that is both dye-containing and film-containing. Chart 142 (FIG. 9) is similar to Chart 140 (FIG. 8) insofar as Chart 142 relates to the ability of the lens 100 to filter out UV light. However, Chart 142 relates to characteristics of the lower portion 128 of lens 100 wherein the tinting is provided by the light colored polarizing film layer 42, but not the dye layers 34, 36, as the dye layers are normally not present in the lower portion 128 of the lens 100.

Chart 148 (FIG. 6) relates to the light passage properties of the lens 100, and in particular, the values obtained and contained within the chart reflect that the lens is an optical quality lens that will not, because of its construction or composition, detract significantly from the clarity of the image seen through the lens 100 by the user.

It will be appreciated by those skilled in the art that modifications and variations can exist within the scope and spirit of the present invention and that the scope of the instant invention is limited only by the appended claims.

What is claimed:

1. A polarized tinted lens for a sunglass, the lens including
a first yellow-green polarizing tinting member extending substantially throughout the lens, and being capable of reducing the transmission of glare through the lens, and
a second tinting member, tinted a second color other than yellow-green, the second tinting member at least partially overlaying the first tinting member so that light passing through the lens in a first zone where the first and second tinting members are overlain must pass through both the first and second tinting members, to impart to the lens a color formed from the combination of the colors of the first and second tinting members, and a second zone wherein the first tinting member is present and the second tinting member is absent to impart to the lens a yellow-green color.

2. The polarized tinted lens of claim 1 wherein the first tinting member allows a generally greater degree of yellow and green light to be transmitted through the lens than any of blue light, orange light and ultraviolet light.

3. The polarized tinting lens of claim 1 wherein the first and second tinting members, when overlain, allow a generally greater degree of yellow and green light to be transmitted through the lens than any of blue light, orange light and ultra violet light.

4. The polarized tinted lens of claim 1 wherein the lens includes a first plastic layer and a second plastic layer, and wherein the first tinting member comprises a tinting member sandwiched between the first and second plastic layers.

5. The polarized tinted lens of claim 1 wherein the first tinting member comprises a polarized film, and the second tinting member comprises a layer of plastic that has been dyed over a portion of its area.

6. The polarized tinted lens of claim 1 wherein the lens includes a first and a second plastic layer and wherein the first tinting members comprises a polarized film sandwiched between the first and second plastic layers, and the second tinting colorant comprises a gradient dye applied to the first plastic layer, and a gradient dye applied to the second plastic layer.

7. The polarized tinted lens of claim 1 where the lens includes a first zone wherein the first and second tinting members are overlain and a second zone, wherein the second tinting member is absent, and wherein the first zone permits less light to be transmitted therethrough than the second zone.

8. The polarized tinted lens of claim 7 where the first zone comprises generally greater than fifty percent of the area of the lens, and the second zone comprises less than 50% of the area of the lens.

9. The polarized tinted lens of claim 7 wherein the first zone comprises between about 50% and 60% of the area of the lens.

10. A polarized tinted lens for a sunglass, the lens including
a first polarizing tinting member extending throughout the lens, and being capable of reducing the transmission of glare through the lens, wherein the first tinting member is a yellow-green tinting member and
a second tinting member tinted a second color other than yellow-green, the second tinting member at least partially overlaying the first tinting member so that light passing through the lens in the portion where the first and second tinting members are overlain must pass through both the first and second tinting members,
wherein the lens includes a first zone wherein the first and second tinting members are overlain, and a second zone wherein the first tinting member is present and the second tinting member is absent.

11. The polarized tinted lens of claim 10 wherein the first zone permits less light to be transmitted therethrough than the second zone.

12. The polarized tinted lens of claim 11 wherein the first zone comprises generally greater than 50% of the area of the lens, and the second zone comprises less than 50% of the area of the lens.

13. The polarized tinted lens of claim 12 wherein the first zone comprises between about 50% and 60% of the area of the lens.

14. The polarized tinted lens of claim 13 wherein the first tinting member comprises a polarized film, and wherein the first and second tinting members are overlain in the first zone.

15. A polarized tinted lens for a sunglass, the lens including
a first polarizing tinting member capable of reducing the transmission of glare through the lens, wherein the first tinting member is a yellow-green tinting member and
a second tinting member, the second tinting member at least partially overlaying the first tinting member so that light passing through the lens in the portion where the first and second tinting members are overlain must pass through both the first and second tinting members,
wherein the lens includes a first zone wherein the first and second tinting members are overlain, and a second zone wherein the first tinting member is present and the second tinting member is absent and wherein the second tinting member is a blue tinting member, and the first zone comprises a generally green tinted zone.

16. The polarized tinted lens of claim 15 wherein the first zone permits less light to be transmitted through the lens than the second zone.

17. The polarized tinted lens of claim 16 wherein the first zone contains a greater amount of applied dye than the second zone.

18. The polarized tinted lens of claim 17 wherein at least a portion of the second zone is substantially free of the dye of the second tinting member.

* * * * *